(12) United States Patent
Ito et al.

(10) Patent No.: US 6,873,498 B2
(45) Date of Patent: Mar. 29, 2005

(54) MAGNETIC HEAD AND METHOD OF MANUFACTURING THE SAME

(75) Inventors: Takashi Ito, Kawasaki (JP); Mitsumasa Okada, Kawasaki (JP); Masashi Yanagawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/102,452

(22) Filed: Mar. 20, 2002

(65) Prior Publication Data

US 2003/0112561 A1 Jun. 19, 2003

(30) Foreign Application Priority Data

Dec. 19, 2001 (JP) .................................... 2001-385969

(51) Int. Cl.⁷ .............................................. G11B 5/187
(52) U.S. Cl. ................................................... 360/317
(58) Field of Search ................................ 360/317, 122, 360/126

(56) References Cited

U.S. PATENT DOCUMENTS

| | | | | |
|---|---|---|---|---|
| 5,966,277 A | * | 10/1999 | Koshikawa et al. | ........ 360/126 |
| 6,538,844 B2 | * | 3/2003 | Takano et al. | ............... 360/122 |
| 6,556,377 B2 | * | 4/2003 | Chen et al. | ................. 360/126 |
| 6,631,054 B2 | * | 10/2003 | Miyazaki et al. | ........... 360/317 |
| 2002/0191351 A1 | * | 12/2002 | Santini | ....................... 360/317 |

FOREIGN PATENT DOCUMENTS

| | | |
|---|---|---|
| JP | 11-007608 | 1/1999 |
| JP | 11007608 A * | 1/1999 |

* cited by examiner

*Primary Examiner*—Tianjie Chen
(74) *Attorney, Agent, or Firm*—Greer, Burns & Crain, Ltd.

(57) ABSTRACT

A magnetic head has a narrow upper magnetic pole and is capable of restricting side erasure and record bleeding. The magnetic head is capable of writing data on a recording medium, and includes an upper magnetic pole including a pole section which faces the recording medium and has a prescribed width, and a lower magnetic pole including grooves respectively formed on the both sides of the pole section. A level of edges of the grooves are lower than that of an upper face of the lower magnetic pole.

3 Claims, 5 Drawing Sheets

MAGNETIC HEAD AND METHOD OF MANUFACTURING THE SAME

BACKGROUND OF THE INVENTION

The present invention relates to a magnetic head and a method of manufacturing the magnetic head.

Recording density of magnetic disk drives and magnetic tape recorder have been made higher, so magnetic heads, which have narrow core width and capable of restricting record bleeding, are required.

Japanese Patent Gazette No. 11-7608 discloses a method of manufacturing a magnetic head having narrow core width, in which an upper magnetic pole is trimmed by a focussed ion beam (FIB). In the FIB trimming step, parts of a lower magnetic pole respectively located on the both sides of the upper magnetic pole are trimmed or grooved unit reaching prescribed depth, and width of the upper and lower magnetic poles are made equal so as to make recording density higher. Further, a distance between the upper magnetic pole and an upper face of the lower magnetic pole is made longer so as to prevent side erasure of magnetic flux and record bleeding as much as possible.

However, the above described conventional technology has following disadvantages.

FIG. 15 is a schematic view of the upper magnetic pole 10 and the lower magnetic pole 12 before the FIB trimming is executed. A gap layer 14 is made of alumina, $SiO_2$, etc. FIG. 16 is a schematic view of the both after the FIB trimming is executed.

FIB is capable of trimming and forming the upper magnetic pole 10 into a narrow pole with high accuracy, but V-shaped grooves 16, which are inclined outward, are simultaneously formed at parts of the lower magnetic pole 12 located on the both sides of the upper magnetic pole 10. Therefore, edges 18 must be formed in the lower magnetic pole 12. Magnetic flux is apt to concentrate to the edges 18, so side erasure and record bleeding are apt to occur.

Further, if width of the grooves is made wider, by FIB, so as to make the distance between the edges 18 and the upper magnetic pole 10 longer, throughput must be sharply made lower.

SUMMARY OF THE INVENTION

The present invention has been invented so as to solve the above described disadvantages of the conventional technology.

An object of the present invention is to provide a magnetic head which has a narrow upper magnetic pole and capable of restricting side erasure and record bleeding.

Another object of the present invention is to provide a method of manufacturing the magnetic head.

To achieve the objects, the magnetic head for writing data on a recording medium comprises: an upper magnetic pole including a pole section, which faces the recording medium and has a prescribed width; and a lower magnetic pole including grooves, which are respectively formed on the both sides of the pole section, wherein level of edges of the grooves are lower than that of an upper face of the lower magnetic pole.

The method of manufacturing a magnetic head for writing data on a recording medium comprises the steps of: forming an upper magnetic pole on a lower magnetic pole with a gap layer; trimming parts of the lower magnetic pole respectively located on the both sides of the upper magnetic pole, by an ion mill, until reaching prescribed depth; and trimming both side faces of the upper magnetic pole and further trimming the parts of the lower magnetic pole on the both sides of the upper magnetic pole by a focussed ion beam.

Another method comprises the steps of: forming an upper magnetic pole on a lower magnetic pole with a gap layer; trimming both side faces of the upper magnetic pole and parts of the lower magnetic pole respectively located on the both sides of the upper magnetic pole by a focussed ion beam; further trimming the parts of the lower magnetic pole on the both sides of the upper magnetic pole, by an ion mill, until reaching prescribed depth.

In the present invention, core width of the upper magnetic pole can be narrower, and side erasure can be restricted. Further, the level of the edges of the grooves are lower than that of the upper face of the lower magnetic pole, so that the distance between the edges and the side faces of the upper magnetic pole can be longer, so that concentration of magnetic flux to the edges and record bleeding can be restricted.

BRIEF DESCRIPTION OF THE DRAWINGS

Embodiments of the present invention will now be described by way of examples and with reference to the accompanying drawings, in which:

FIGS. 1–3 show the steps of manufacturing a magnetic head and are seen from a front end of the magnetic head, wherein FIG. 1 is a sectional view in which a gap layer has been formed;

FIG. 2 is a sectional view in which a window for forming an upper magnetic pole has been formed on photo resist; and FIG. 3 is a sectional view in which the upper magnetic pole has been formed;

FIGS. 4–6 show the steps of manufacturing the magnetic head and are seen from a side of a coil section of the magnetic head, wherein FIG. 4 is a sectional view in which a coil has been formed;

FIG. 5 is a sectional view in which the photo resist has been applied; and

FIG. 6 is a sectional view in which the upper magnetic pole has been formed;

FIGS. 8–10 show the steps of a first method for trimming the upper magnetic pole, wherein FIG. 8 is an explanation view of a state before trimming;

FIG. 9 is an explanation view of a state after ion mill trimming is executed; and FIG. 10 is an explanation view of a state after FIB trimming is executed;

FIGS. 11–13 show the steps of a second method for trimming the upper magnetic pole, wherein FIG. 11 is an explanation view of a state before trimming;

FIG. 12 is an explanation view of a state after FIB trimming is executed; and

FIG. 13 is an explanation view of a state after ion mill trimming is executed;

FIGS. 15 and 16 show the steps of the conventional method for trimming the upper magnetic pole, wherein FIG. 15 is a schematic view before trimming is executed; and FIG. 16 is a schematic view after FIB trimming is executed.

DETAILED DESCRIPTION OF THE PREFERRED EMBODIMENTS

The preferred embodiments of the present invention will now be described in detail with reference to the accompanying drawings.

In the present embodiments, an upper magnetic pole is formed by the conventional manner. An example will be briefly explained.

Figure 1:
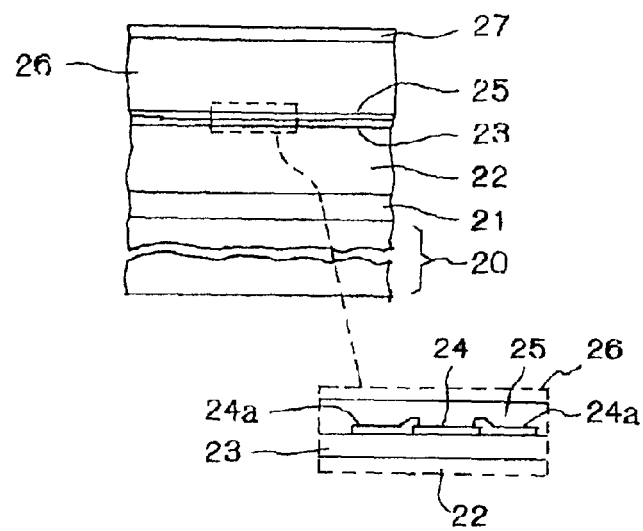

Firstly, as shown in FIG. 1, a protection film 21 made of alumina, a lower magnetic shielding layer 22 made of an Fe—Ni alloy and a first nonmagnetic insulating layer 23 made of alumina are formed on a circular disk-shaped wafer 20 made of alumina-titanium-carbide ($Al_2O_3TiC$), ferrite or calcium titanate.

Next, a plurality of magnetic transducers 24 are formed on the insulating layer 23. The transducers 24 are arranged, on the insulating layer 23, in a prescribed pattern. Anisotropy magneto-resistive elements, spin-valve magneto-resistive elements or the like are used as the magnetic transducers 24. A pair of leads 24a are respectively connected to both ends of each of the magnetic transducers 24, and the leads 24a are extended to the insulating layer 23.

A second nonmagnetic insulating layer 25 made of alumina, which covers the magnetic transducer 24 and the leads 24a, is formed on the insulating layer 23. An upper shielding layer 26 made of an Fe—Ni alloy is formed on the insulating layer 25.

A recording gap layer 27 made of alumina, whose thickness is about 0.2–0.6 $\mu$m, is formed on the shielding layer 26.

Note that, in the case of a magnetic head having an induction coil, the upper shielding layer 26 acts as a lower magnetic pole layer, so it will be called the lower magnetic pole 26.

Figure 4:
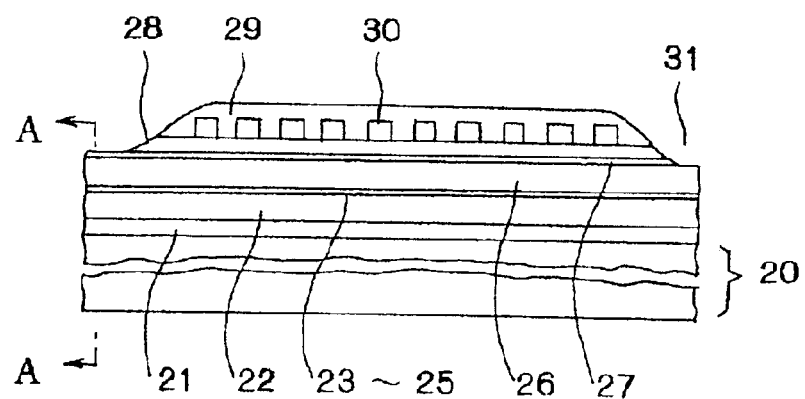

As shown in FIG. 4, a coil 30 sandwiched between a third nonmagnetic insulating layer 28 and a fourth nonmagnetic insulating layer 29 is formed on the gap layer 27. A hole 31 passing a center of the coil 30 is formed in the insulating layers 28 and 29 and the gap layer 27.

Note that, FIG. 1 is a sectional view taken along a line A—A shown in FIG. 4.

Figure 2:
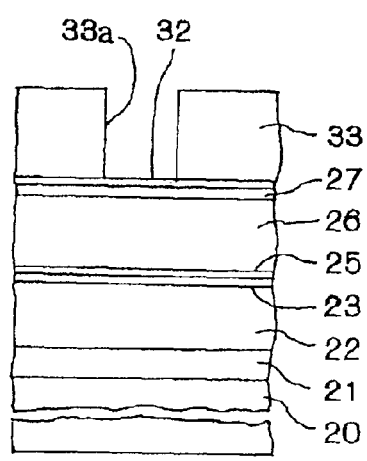
Figure 5:
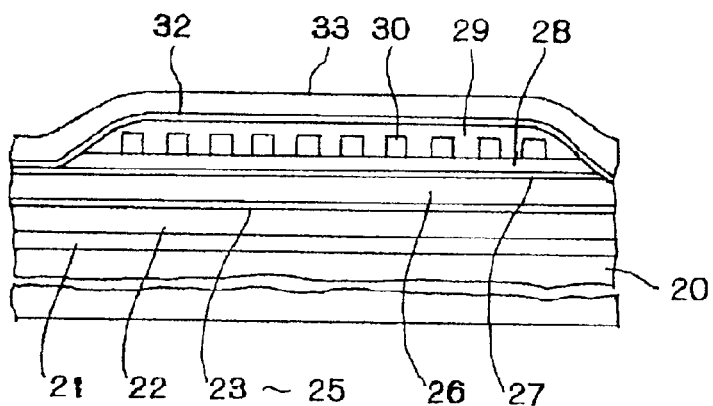

Next, as shown in FIGS. 2 and 5, a plating base layer 32 made of an alloy including Fe, Ni, Co, etc. is formed on the gap layer 27, the insulating layer 29 and a surface of the hole 31. Then, photo resist is applied on the plating base layer 32, then the layer is exposed and developed so as to form a window 33a for forming the upper magnetic pole.

Figure 3:
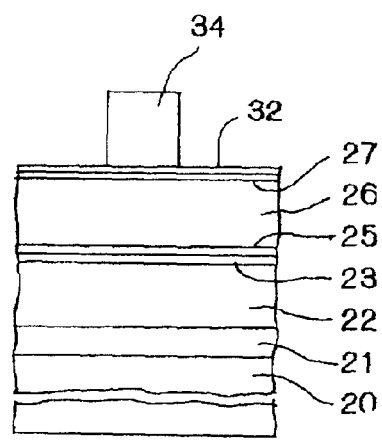
Figure 6:
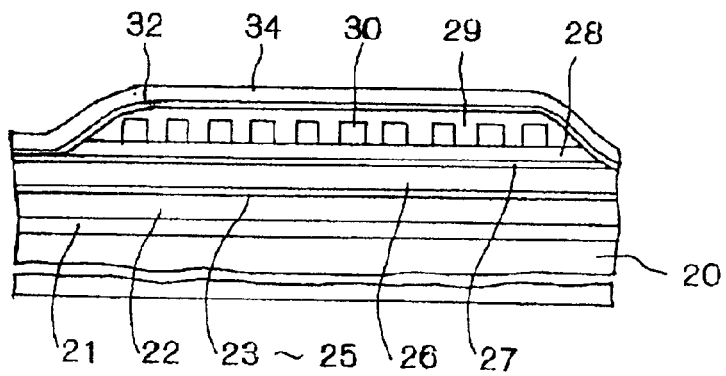

The upper magnetic pole 34, which is made of an alloy including Fe, Ni, Co, etc. and whose thickness is about 5 $\mu$m, is formed in the window 33a by electrolytic plating. Then, as shown in FIGS. 3 and 6, the photo resist 33 is removed.

Figure 7:
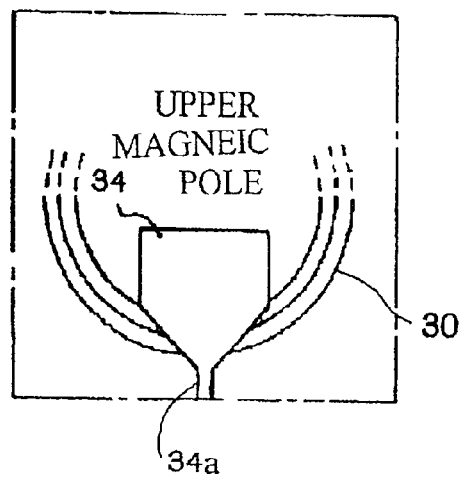
FIG. 7 is a plan view showing the upper magnetic pole and the coil.

As shown in FIG. 7, the upper magnetic pole 34 is formed into a thin pole section 34a in a range in which the upper magnetic pole 34 faces a recording medium, and the opposite part of the upper magnetic pole 34 is connected to the lower magnetic pole 26 via the hole 31.

Note that, the material of the magnetic shielding layer 22, the lower magnetic pole 26 and the upper magnetic pole 34 are not limited to the Fe—Ni alloy. And they may be formed by not only electrolytic plating but also spattering, etc.

The upper magnetic pole 34 is formed by the above described manner.

The feature of the present invention is methods of trimming the upper magnetic pole 34.

Figure 8:
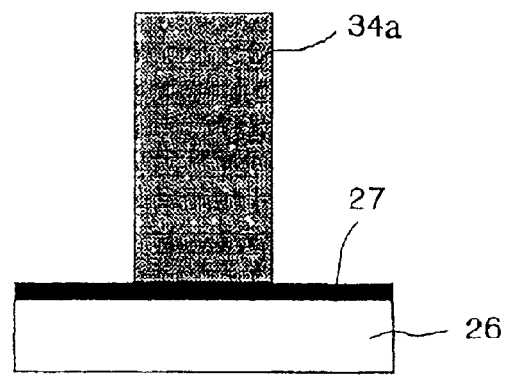
Figure 9:
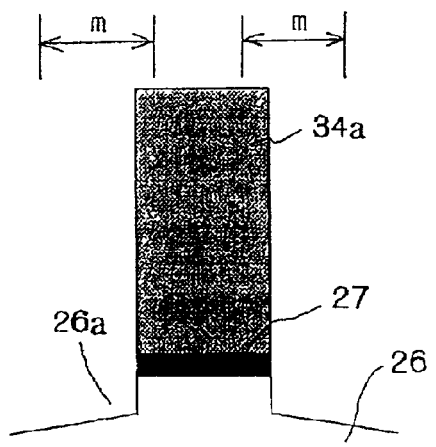
Figure 10:
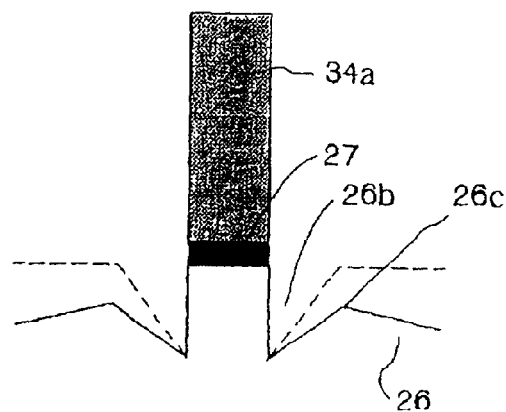

FIGS. 8–10 show the steps of a first method.

FIG. 8 shows the upper magnetic pole 34 and the lower magnetic pole 26 before the trimming is executed.

Firstly, as shown in FIG. 9, an ion beam irradiates to the pole section 34a of the upper magnetic pole 34 and its periphery while the substrate 20 is rotated. By this ion mill trimming, the plating base layer 32 in a prescribed range, in which the ion beam has been applied, is removed, then the gap layer 27 is removed by reactive ion etching (RIF). Further, the lower magnetic pole 26 is partially trimmed or grooved until reaching prescribed depth, so that a concave section 26a is formed in the lower magnetic pole.

The ion beam diagonally irradiates to the substrate 20.

Parts of a surface of the lower magnetic pole 26, which are located in the vicinity of the pole section 34a, are apt to be shaded from the ion beam by the pole section 34a, so amount of the ion beam applied to the parts is less than that applied to other parts. Parts of a surface of the concave section 26a, which are located near the pole section 34a, is higher than other parts thereof. Namely, the surface of the concave section 26a is formed into a tapered shape. Amount of trimming the lower magnetic pole 26 or depth of the concave section 26a is about 1 $\mu$m.

Next, both side faces of the pole section 34a and upper parts of the lower magnetic pole 26 on the both sides of the pole section 34a are trimmed by an FIB having width of "m".

By the FIB trimming, the pole section 34a and the upper parts of the lower magnetic pole 26 are trimmed and made thin until reaching prescribed width, and V-shaped grooves 26b inclined outward are formed, on the both sides of the pole section 34a, in the lower magnetic pole 26. With this structure, edges 26c are formed in the concave section 26a.

Figure 16:
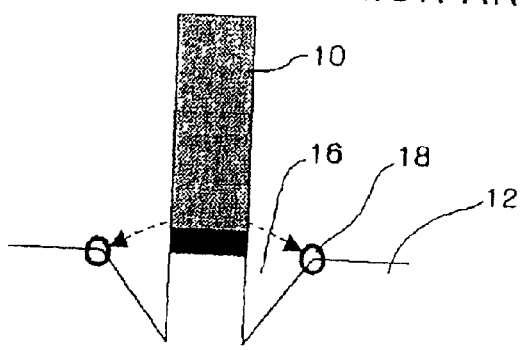

FIB is applied to the surface of the concave section 26a, which has been made lower by the ion mill trimming and whose level is lower than other parts of the lower magnetic pole 26, so that the surface of the concave section 26a is further trimmed. Therefore, level of the edges 26c are lower than that of the edges 18 (see FIG. 16), which are formed by the conventional method. Unlike the conventional method, the distance between the side faces of the pole section 34a of the upper magnetic pole 34 and the edges 26c can be made longer, so that side erasure of magnetic flux can be restricted and record bleeding can be reduced.

Another method of trimming the upper magnetic pole 34 will be explained with reference to FIGS. 11–13.

Figure 11:
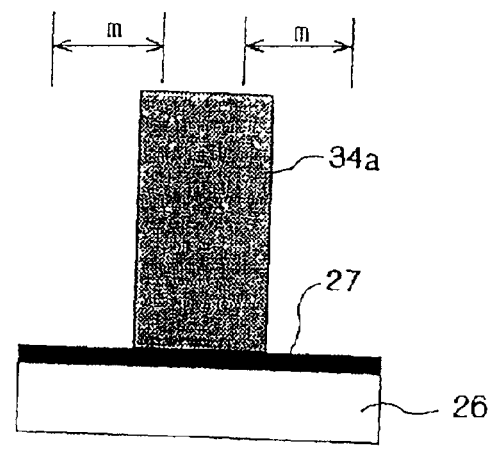
Figure 12:
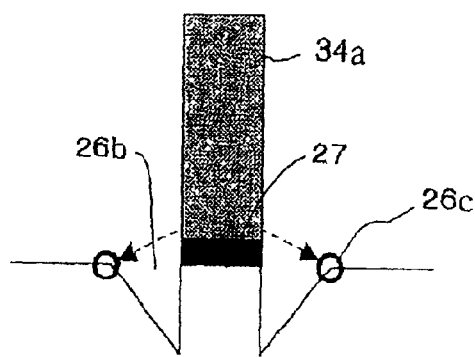

FIG. 11 shows a state before the trimming is executed.

In the present embodiment, the both side faces of the pole section 34a of the upper magnetic pole 34 and upper parts of the lower magnetic pole 26 on the both sides of the pole section 34a are trimmed by an FIB having width of "m".

By the FIB trimming, the pole section 34a and the upper parts of the lower magnetic pole 26 are trimmed and made thin until reaching prescribed width, and the V-shaped grooves 26b inclined outward are formed, on the both sides of the pole section 34a, in the lower magnetic pole 26. At that time, the plating base layer 32 in a prescribed range, in which the FIB has been applied, and the gap layer 27 are removed.

By the FIB trimming, edges 26c of the V-shaped grooves 26b are formed. These steps are executed by the conventional method.

Figure 13:
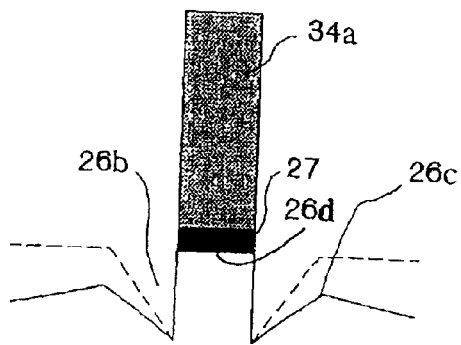

In the present embodiment, as shown in FIG. 13, the ion mill trimming is further executed.

The surface of the lower magnetic pole 26 including the V-shaped grooves 26b is further trimmed until reaching a prescribed depth. Therefore, the level of the edges 26c are further made lower than that shown in FIG. 12. Namely, the distance between the side faces of the pole section 34a of the upper magnetic pole 34 and the edges 26c can be made longer, so that side erasure of magnetic flux can be restricted and record bleeding can be reduced.

In the both methods of the above described embodiments, the pole section 34a of the upper magnetic pole 34 is made thin, and the V-shaped grooves 26b inclined outward are formed, on the both sides of the pole section 34a, in the lower magnetic pole 26. The side faces of the pole section 34a and inner faces of the V-shaped grooves 26b are smoothly connected. The width of the pole section 34a is equal to that of an upper part of the lower magnetic pole 26. The level of the edges 26c of the grooves 26b are lower than that of an upper face 26d of the lower magnetic pole 26.

To completely produce the magnetic head, electrode pads (not shown), which will be connected to the transducer 24 and the coil 30, are formed, and an alumina protection layer (not shown) is formed on the upper magnetic pole 34 so as to cover the upper magnetic pole 34.

The wafer (substrate) 20 is not separated until completing the step of forming the protection layer. Namely, a plurality of the magnetic heads are matrically arranged in the wafer 20.

The wafer 20 is cut to form a plurality of bar-shaped members, in each of which the magnetic heads are linearly arranged, an air bearing surface of the bar-shaped member is abraded, rails for floating sliders are formed, then the bar-shaped member is cut to separate the magnetic heads respectively.

Figure 14:
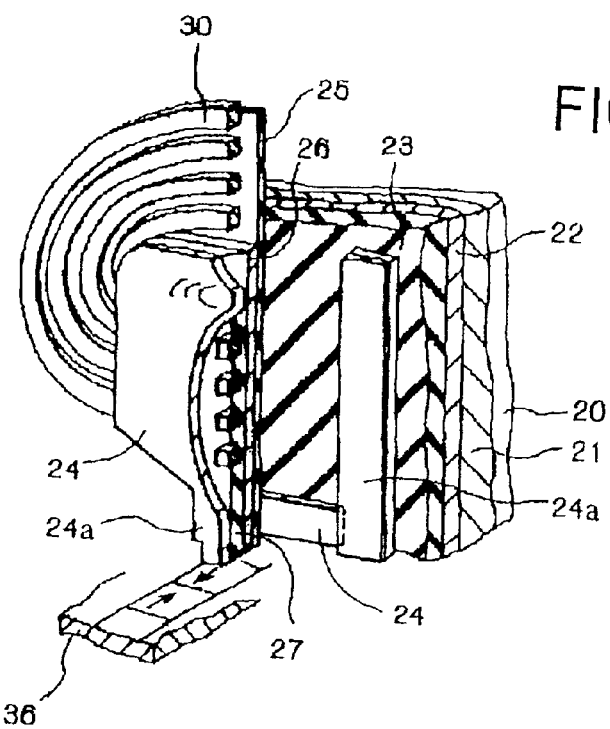
FIG. 14 is an exploded perspective view of a main part of the magnetic head.
Figure 15:
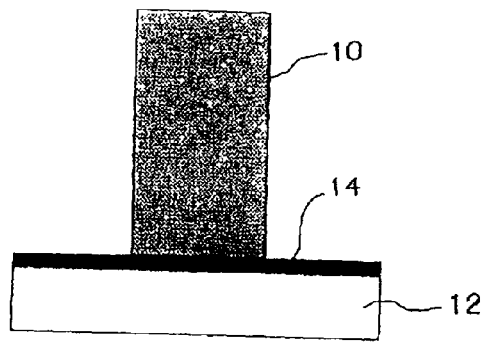

Note that, FIG. 14 is an exploded perspective view of a main part of the magnetic head, which shows arrangement of the transducer 24, etc. A symbol 30 stands for a magnetic disk.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A magnetic head for writing data on a recording medium, comprising:

an upper magnetic pole including a pole section, which has been trimmed by ion mill trimming and FIB trimming to have a prescribed width and which faces the recording medium; and a lower magnetic pole having an upper surface and including grooves, said grooves being respectively formed in said upper surface on both sides of said pole section by said ion mill trimming and FIB trimming, wherein a first portion of said upper surface below said pole section is higher than a second remaining portion of said upper surface upon said ion mill and FIB trimming.

2. A method of manufacturing a magnetic head for writing data on a recording medium, comprising the steps of:

forming an upper magnetic pole on a lower magnetic pole with a gap layer;

ion mill trimming parts of said lower magnetic pole respectively located on both sides of said upper magnetic pole until reaching prescribed depth; and further FIB trimming both side faces of said upper magnetic pole and further trimming the parts of said lower magnetic pole on both sides of said upper magnetic pole by FIB trimming, wherein the level of edges of said grooves, which have been basically formed by FIB trimming, are made lower than that of an upper face of said lower magnetic pole.

3. A method of manufacturing a magnetic head for writing data on a recording medium, comprising the steps of:

forming an upper magnetic pole on a lower magnetic pole with a gap layer, said lower magnetic pole including an upper surface;

FIB trimming both side faces of said upper magnetic pole and parts of said upper surface of said lower magnetic pole respectively located adjacent said both side faces of said upper magnetic pole by FIB trimming;

further ion mill trimming all remaining parts of said upper surface of said lower magnetic pole adjacent said both side faces of said upper magnetic pole until reaching a prescribed depth below said upper surface.

* * * * *